(12) United States Patent
Guender et al.

(10) Patent No.: US 11,353,130 B2
(45) Date of Patent: Jun. 7, 2022

(54) HYDRAULIC DISTRIBUTOR BLOCK, HYDRAULIC ASSEMBLY, AND METHOD

(71) Applicant: Robert Bosch GmbH, Stuttgart (DE)

(72) Inventors: Andreas Guender, Ramsthal (DE); Jan Lukas Bierod, Bad Camberg (DE); Marco Scholz, Burgsinn (DE); Rene Huettl, Chemnitz (DE)

(73) Assignee: Robert Bosch GmbH, Stuttgart (DE)

( * ) Notice: Subject to any disclaimer, the term of this patent is extended or adjusted under 35 U.S.C. 154(b) by 434 days.

(21) Appl. No.: 16/655,542

(22) Filed: Oct. 17, 2019

(65) Prior Publication Data
US 2020/0124196 A1 Apr. 23, 2020

(30) Foreign Application Priority Data

Oct. 19, 2018 (DE) .................... 10 2018 126 116.0

(51) Int. Cl.
| | |
|---|---|
| *F04B 9/12* | (2006.01) |
| *F16K 27/00* | (2006.01) |
| *F04B 39/10* | (2006.01) |
| *F16K 15/02* | (2006.01) |

(52) U.S. Cl.
CPC ............ *F16K 27/003* (2013.01); *F04B 39/10* (2013.01); *F16K 15/02* (2013.01)

(58) Field of Classification Search
CPC ............................... F16K 27/003; F04B 39/10
USPC ........................................... 137/884
See application file for complete search history.

(56) References Cited

U.S. PATENT DOCUMENTS

| | | | | |
|---|---|---|---|---|
| 3,900,137 A | * | 8/1975 | Bricout | G01F 11/021 137/625.11 |
| 2003/0194332 A1 | * | 10/2003 | Jahn | F04B 43/0733 417/395 |

* cited by examiner

*Primary Examiner* — P. Macade Nichols
(74) *Attorney, Agent, or Firm* — Maginot, Moore & Beck LLP

(57) ABSTRACT

A hydraulic distributor block for fluid guidance, having at least two port surfaces which each have at least one port opening. The port openings of the port surfaces are connected by a flow duct, with the flow duct having at least one bend which is continuously curved and the port surfaces being spatially separated from one another.

16 Claims, 3 Drawing Sheets

HYDRAULIC DISTRIBUTOR BLOCK, HYDRAULIC ASSEMBLY, AND METHOD

This application claims priority under 35 U.S.C. § 119 to application no. DE 10 2018 126 116.0, filed on Oct. 19, 2018 in Germany, the disclosure of which is incorporated herein by reference in its entirety.

The disclosure relates to a hydraulic distributor block. Moreover, this disclosure is based on a hydraulic assembly having said hydraulic distributor block and on three methods for producing the hydraulic distributor block.

BACKGROUND

The prior art has disclosed hydraulic assemblies which, for the purpose of providing one or more consumers with a supply, have at least one pump with a drive motor, a container for the liquid storage, that is to say a tank, and a filter. In order to conduct or to distribute the hydraulic fluid to the consumers, the hydraulic assembly may also have a hydraulic distributor block. The latter may be connected to the pump and to the tank, for example by pressure hoses, and establish the connection to consumers which are supplied with fluid by the pump. That is to say, a distributor block has at least one port for the pump or the tank and at least one port for the consumer, in order to connect the latter to the tank or the pump. A respective flow duct is formed therebetween, with the result that the consumer has at least one port which is connected to the pump and/or one port which is connected to the tank. Valve blocks are normally manufactured by a cutting machining process. In other words, the flow ducts can be produced by way of drilling. If, therefore, a diversion in the distributor block is required, then said diversion is conventionally produced by the meeting of two bore holes. For reasons connected with installation space, a diversion of the flow duct that is greater than 90 degrees may also be necessary. This is realized within the distributor block normally by auxiliary bores, which are closed off at a later stage. That is to say, the manufacture of a diversion of the flow duct can be very complex, and moreover, in the case of conventional manufacturing by a cutting machining process, there are limitations on the shaping of the inner geometry. Since the bores are routed only in a rectilinear manner, the bore holes normally meet at right angles. The auxiliary bores and also the diversion give rise to sharp-edged corners within the flow duct, which can lead for example to intensive swirling and to an increase in the flow resistance within the distributor block.

By contrast to this, it is the object of the disclosure to provide a hydraulic distributor block which, in terms of apparatus, is simple and inexpensive and which has optimized flow guidance. A further object of the disclosure is to provide a hydraulic assembly having said hydraulic distributor block, and also to provide a simple and inexpensive method for producing the hydraulic distributor block. Preferably, the disclosed hydraulic distributor block satisfies sector-specific aspects of series manufacture.

SUMMARY

The objects are achieved according to the features of the hydraulic distributor block, hydraulic assembly, and methods disclosed herein.

According to the disclosure, a hydraulic distributor block for fluid guidance is provided. The hydraulic distributor block may, for example, be configured for conducting the flow of a fluid between the pump, and/or the tank, and a consumer. For this purpose, the distributor block has on at least one first port surface at least one consumer port opening, via which the consumer is able to be connected to the distributor block. Furthermore, the distributor block has at least one further port surface, which likewise has at least one port opening. It is possible for example for a pump and/or a tank to be able to be connected to the port opening. The port opening and the consumer port opening are connected by at least one flow duct. Furthermore, the port surfaces of the distributor block are spatially separated from one another, that is to say the port surfaces are not directly opposite one another on the distributor block. The flow duct is bent, and/or it has at least one bend, so as to connect the port openings to one another, wherein the curvature of said bend is continuous. In other words, the radius of curvature of the bend is greater than zero and the flow duct is free of sharp edges. The radius of curvature may additionally be variable over the bend.

One advantage of the disclosed hydraulic distributor block is that, owing to the bend within the flow duct, which bend is formed to be continuous and in particular has a radius of curvature which is greater than zero, the flow guidance can be optimized and there is thus less flow loss within the flow duct. It is furthermore possible for flow noises to be reduced by said flow guidance. The diversion of the flow guidance by a sharp edge, as is present for example in the case of flow guidance which has been formed as a result of a cutting machining process, results in it being possible for passing fluid at the sharp edge to lead to increased generation of noise, and moreover for swirling, which increases the flow resistance within the distributor block, to occur at the sharp edge. The disclosed hydraulic distributor block thus allows the efficiency, for example of the entire assembly in which the distributor block is able to be installed, to be increased, and also allows the noise emission to be reduced.

Preferably, the flow duct may have one or more bends, which in total have a curvature of at least 180 degrees. In other words, the flow duct may have for example at least one 180-degree bend and/or at least two 90-degree bends, wherein the bends are continuous.

It is particularly preferable for the bend or the bends to be enclosed by material entirely and/or in one piece and/or substantially completely and/or by six sides. In other words, the bend or bends is/are not realized by way of auxiliary bores. The hydraulic distributor block can be cast and thus the flow ducts are provided and/or present already during the production process. An advantage of this is for example that the avoidance of auxiliary bores results in the avoidance of sharp edges, at which swirling of the flow can be formed. Furthermore, it is not necessary for auxiliary bores to be closed, by for example closure plugs, after the flow duct has been manufactured, and the assembly of the hydraulic distributor block can thus be facilitated and sped up. Moreover, safety risks can be reduced through the avoidance of auxiliary bores. An auxiliary bore with a closure plug can, for example, constitute a mechanical weak point of the distributor block and, for example, reduce the strength of the distributor block. In this way, there may for example be the risk of the distributor block not withstanding the high pressure in the interior, and the occurrence for example of leakage.

Preferably, the distributor block has at least two flow ducts, wherein a first flow duct connects the consumer preferably to the tank of the hydraulic assembly, and a second flow duct preferably connects the consumer to the pump of the hydraulic assembly. In other words, the first flow duct connects a first consumer port opening of the first port surface to a pump port opening of the second port surface, and a further flow duct connects a second consumer port opening to a tank port opening of the second port surface. It is thus possible for the distributor block to be simultaneously configured for fluid distribution and/or for fluid guidance between the consumer and the pump and between the consumer and the tank.

Preferably, the consumer port openings may be formed such that they are able to be connected to a module block and/or to a multistation plate and/or to a control block, in particular in accordance with a standard, particularly preferably the IH20 standard. This is advantageous since the module block or the multistation plate or the control block makes possible a flexible construction of the hydraulic assembly, for example it is possible for control blocks in accordance with the IH20 standard to be individually assembled from different modules and additional vertically linked structures. This allows the distributor block to be versatile.

The valve block furthermore preferably has at least one valve opening, into which a valve is able to be inserted, and/or a valve port, to which a valve is able to be connected. The valve opening and/or the valve port are preferably connected to the flow duct or to one of the flow ducts. The flow duct which connects the consumer port opening to the pump port opening may be connected for example to a valve opening into which a check valve is able to be inserted. Furthermore, it is possible for example for there to be a further valve opening and/or a valve port into which a pressure-limiting valve is able to be inserted. The latter is preferably arranged, fluidically, or in terms of a circuit, between the two flow ducts, that is to say it has both a connection to the flow duct which connects the pump port opening to the consumer port opening, and to the flow duct which connects the tank port opening to a further consumer port opening. Thus, in the case of overpressure in the pump line, it is possible for a connection to the tank to be opened. The valve opening, like the flow duct too, is preferably formed by way of a casting process.

The hydraulic distributor block furthermore preferably has at least one filter receptacle which is formed for receiving a filter, for example a pressure filter. Here, the filter is able to be received at least partially into the filter receptacle. The partial receiving of the filter into the filter receptacle results for example in installation space being saved. Conventionally, a receptacle for a filter is flange-mounted on a straight surface of the distributor block, that is to say conventionally, more space and an additional component are required. This is avoided by the disclosed hydraulic distributor block. Moreover, the filter receptacle may be of circular form and have a thread, that is to say have a screwing-in opening. In this way, the pressure filter can be fitted easily and quickly.

The filter receptacle is moreover integrated in the hydraulic distributor block such that an installed pressure filter has a connection to a consumer port opening and to the pump port opening. In other words, the flow duct which connects the pump port opening to a consumer port opening runs firstly into the filter receptacle and, from there, further to the consumer port opening. That is to say, the filter receptacle has two openings, of which one opening is preferably connected to the pump port opening and optionally also to the tank port opening, in particular via the valve opening into which for example a pressure-limiting valve is able to be inserted, and a further opening is connected to a consumer port opening. It is thus possible for the fluid to be filtered before being conducted from the pump to the consumers.

Furthermore, the distributor block may have at least one detection opening, in particular a sensor opening for the insertion of a sensor, and/or a measurement port, in particular a miniature measurement port. It is preferably possible for a measurement device to be able to be inserted into the measurement port and/or into the miniature measurement port. Through the integration of at least one detection opening, simple and inexpensive checking of the pressure or the temperature of the fluid at defined measurement points or a defined measurement point is guaranteed. In other words, it is not necessary to introduce the sensor opening and/or the measurement port at a later stage, and consequently measurement points can be precisely defined in the distributor block. Consequently, the comparability of the measurement results is increased. Furthermore, the fitting of the sensor and of the measurement device is facilitated.

In a further exemplary embodiment, the distributor block may be designed such that at least one port surface is inclined at between zero and 90 degrees with respect to a further, adjacent surface. In other words, the port surface does not form a right angle with at least one adjacent surface. This makes it possible for example for accessibility to be simplified during assembly if, for example, pressure hoses are connected to the distributor block, for example while the latter is already fitted in a hydraulic assembly. Moreover, costs are saved due to a reduction in assembly time. Furthermore, the inclination of the surface can be formed such that the bending angle of hoses, in particular in an installed state, is reduced, said hoses being connected to the consumer port openings and/or to the pump port openings and/or to the tank port openings. As a result of the reduction in bending angles of the hoses, it is possible for example for smaller forces to be exerted on a port.

The second port surface, which has the pump port opening and the tank port opening, may have at least one further pump port opening which is able to be connected to both of the first consumer port openings. Preferably, the flow ducts which are connected to a respective pump port opening connect to one another, and thus combine to form a flow duct. This makes it possible for example for two pumps, via the distributor block, to supply fluid to the consumer(s) connected to the distributor block. By way of this construction, the pumps are connected in parallel. In this way, it is possible for example for an increased delivery rate for the driving of consumers to be generated. In a further exemplary embodiment, it is also possible for two pressure lines of a pump to be able to be connected to the at least two pump port openings.

Furthermore, the distributor block may also have at least two tank port openings. At least one of the tank ports is preferably arranged on the second port surface.

The distributor block preferably has in addition an optimized shaping of the outer basic shape. In other words, apart from the wall thickness, which is required for obtaining sufficient strength, the basic shape can be matched to the shape of the flow ducts. This can save material, and moreover it is thereby possible for installation space to be saved. Consequently, the distributor block can be installed in a confined installation space. The optimized matching of the outer basic shape to the flow ducts may in this case be realized in part or substantially completely.

It is furthermore possible for the outer basic shape of the distributor block to have at least one fastening point, in particular a multiplicity of fastening points. A multiplicity of fastening points results in it being possible for the distributor block to be fastened in different installation positions. The fastening points may in this case be provided on all sides of the distributor block, in particular on five sides. This makes possible flexible use of the distributor block in different hydraulic assemblies. Through the integration of the fastening point(s), the assembly can also be facilitated since said fastening point(s) does/do not need to be prepared for the assembly.

The distributor block may be produced by way of a method which will be described in more detail below. Firstly, a casting mold is provided for the outer basic shape of the distributor block. This may, for example, also contain the negative of the fastening point, which is in particular a cutout into which a thread can be cut after the casting process. Subsequently, in a second step, which may also be carried out at the same as or before the first step, a casting core of the negative of the flow duct(s) is created by 3D printing, in particular by 3D sand core printing. In addition to the flow duct(s), the casting core may also contain the negative of the valve opening and/or valve cutout and/or the negative of the detection opening and also the filter receptacle. The filter receptacle, like the fastening point too, may be machined after the casting, such that a pressure filter is able to be screwed in. The filter receptacle with thread may be realized in this way in a simple and inexpensive manner, whereas a pure cutting machining process would be expensive owing to the machining effort. After the provision of the casting mold for the outer basic shape, and after the creation of the negative of the flow duct(s) and of the other functional element openings by 3D printing, the two casting molds can be assembled and then used for casting. After the casting, and after the component has been removed from the casting mold, it is possible for further machining steps, such as for example thread cutting and/or grinding, to be carried out.

By way of the method for producing the hydraulic distributor block by the casting process with the aid of a core casting mold which is created by 3D printing it is possible for cutting machining, which is conventionally required for producing a distributor block, to be largely omitted. Due to the omission of various process steps, which are necessary during the cutting end manufacturing process, such as for example the deburring at deep bore transition clippings and/or the drilling of the flow ducts and/or the pre-drilling and subsequent milling of the openings or ports for functional elements, such as the pressure filter and/or the valves, the production costs for the distributor block can be greatly reduced. Overall, the method of producing the distributor block reduces the hitherto necessary machining steps. Costs can thereby be saved. A further advantage of producing the distributor block in the casting process is that the strength of the entire distributor block can be increased, since sharp-edged bore intersections are not formed. Furthermore, the mechanical stability is likewise improved in this way. Also, the installation space which is required is reduced owing to the almost unlimited shaping freedom of the 3D printing by which the negative of the flow duct is created. Furthermore, it is also possible by way of this method for production for the outer basic shape of the distributor block to be matched to the application, in particular with regard to the installation space. It is thus possible for the outer basic shape to be very highly matched, at least partially or sectionally, to the shape of the flow duct and/or the flow ducts and/or the functional element openings.

A further method for producing the hydraulic distributor block likewise has, in a first step, the provision of a casting mold for the outer basic shape of the distributor block. Here too, this casting mold may already contain the fastening point. It is additionally possible to create at least one flow duct from pipe parts and/or from at least one bent pipe part, and if appropriate the individual pipe parts may then be connected in a form- and/or force-fitting and/or materially bonded manner. The provision of the casting mold and also the creation of the flow duct from pipe parts may be carried out simultaneously and/or in any desired order one after the other. Subsequently, the flow duct is placed into the casting mold. It is additionally possible to insert place holders for, for example, the valve opening and/or the filter receptacle and/or the detection opening. The distributor block is then cast. In other words, the previously created at least one flow duct is cast into the casting mold. The outer basic shape and the created flow duct may also comprise different materials, such as for example cast iron and/or steel. It is thus possible for use to be made of different material properties, such as for example elasticity and/or strength, so as to produce a more stable and durable distributor block. This manufacturing method likewise allows a great degree of shaping freedom and/or increases the strength. Moreover, by way of this method for production, a reduction of process steps for the manufacture is likewise possible.

In a further method, the hydraulic distributor block may be created by means of 3D metal printing. In the case of 3D metal printing, the shaping possibilities are very numerous since, with this metal particle, layer-by-layer melting onto the workpiece, for example, is realized. Consequently, many different shaping possibilities for the flow ducts are conceivable. A further advantage of metal printing is that a wide variety of metals and metal alloys may be used for the production of the distributor block. Consequently, the material properties are flexible and can be matched to the application requirements. Furthermore, the production of the distributor block by means of 3D metal printing has advantages similar to the production of the hydraulic distributor block by casting from a casting mold with a core casting mold created by 3D printing. In this method too, no edges are formed in the interior of the flow duct. In addition, the process steps for the production by means of 3D metal printing are further reduced, and said production is thus possible without complex post-machining.

BRIEF DESCRIPTION OF THE DRAWINGS

Preferred exemplary embodiments of the disclosure will be discussed in more detail below on the basis of schematic drawings, in which.

DETAILED DESCRIPTION

Figure 1A:
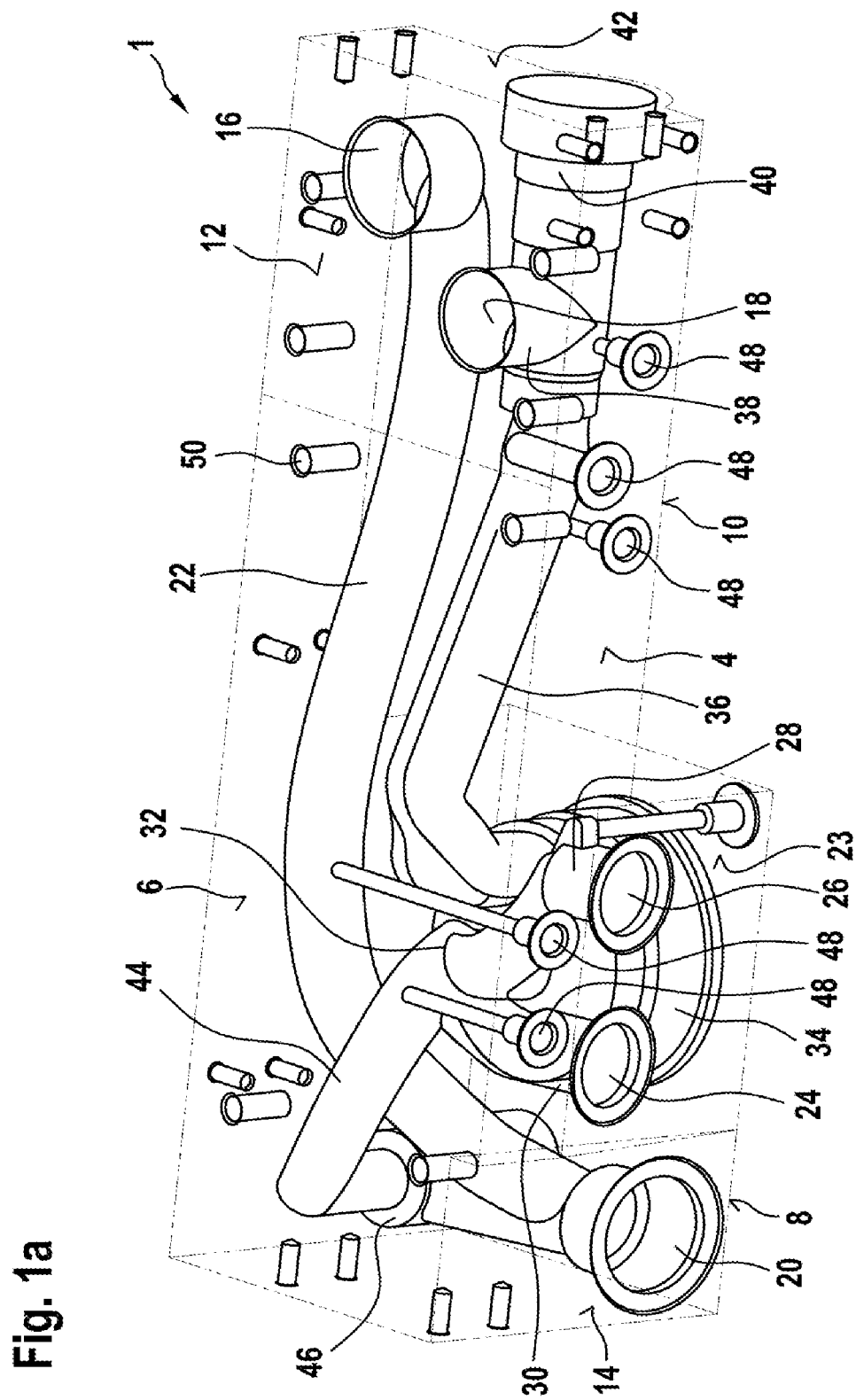
FIG. 1a shows a perspective view of a distributor block with flow ducts and functional element openings.

FIG. 1a shows a distributor block 1 which has an L-like shape. That is to say, two surfaces 4 which are opposite one another in an approximately parallel manner are of approximately L-shaped form. Moreover, the distributor block 1 has a largest surface 6, which is adjacent to the surfaces 4. Opposite the surface 6, the distributor block 1 has two surfaces 8, 10 which, in aggregate, are approximately as large as the surface 6 and which are at different distances from the surface 6, with the surface 8 being further away than the surface 10.

Furthermore, the distributor block 1 has two port surfaces 12, 14. The port surface 12 is part of the surface 6 of the distributor block 1, while the port surface 14 is arranged on an L-shaped surface 4 of the distributor block. The port surface 12 has two consumer port openings 16 and 18.

The consumer port opening 16 is connected to a tank port opening 20 by a flow duct 22, wherein the tank port opening 20 is arranged on the port surface 14. The flow duct 22, which connects the consumer port opening 16 and the tank port opening 20, is formed with a bend which exceeds approximately a 90-degree bend. The flow duct 22 furthermore has a further 90-degree bend, which follows the first 90-degree bend from the tank port opening and opens into the consumer port opening 16. The bends of the flow duct 22 are in this case formed to be approximately perpendicular, meaning that the bends are realized at different levels.

Furthermore, the port surface 14 is divided into two portions, wherein one part of the port surface 14 is an inclined port surface 23, which, with respect to other surfaces, for example with respect to the surface 8, is inclined at an angle not equal to 90°. A first pump port opening 24 and a second pump port opening 26 are arranged on the inclined port surface 23. Said openings have a respective flow duct 28 and 30, which open into a common flow duct 32. The flow duct 30 and the flow duct 28 are bent such that they can be merged together in the flow duct 32. For reasons of construction, the flow duct 18 is bent to a slightly greater extent than the flow duct 20. The flow duct 32 in turn opens into a filter receptacle 34 which is arranged on the surface which, oppositely, is arranged on the surface 8. Furthermore, the consumer port opening 18 has a connection to the filter receptacle by way of a flow duct 36. In other words, a flow duct for a fluid from the pump port opening 24 and/or the pump port opening 26 through the flow ducts 28, 30, 32, via the filter receptacle 34, through the flow duct 36 as far as the consumer port opening 18 is formed in the distributor block 1. The flow duct 36 moreover has a 90-degree bend and has, particularly in a region adjoining the filter receptacle 34, not a circular but an oval basic shape.

The flow duct 36, which connects the consumer port opening 18 to the pump port opening 24, 26 via the filter receptacle 34, also has a T-shaped branch. One portion 38 opens into the consumer port opening 18 and stands approximately vertically on the flow duct 36. The further portion, which adjoins the flow duct 36 in a rectilinear manner, is a valve opening 40. It is possible to insert into the latter for example a check valve which prevents the backflow of the fluid from the consumer port opening 18 to the filter receptacle 34. The valve opening 40 is arranged on an adjacent surface 42 of the largest surface of the valve block 1, said adjacent surface constituting the smallest surface of the valve block.

Aside from the flow ducts 28, 30, a further flow duct 44 opens into the flow duct 32. Said further flow duct connects the flow duct 32 to the tank port opening 20, and to the flow duct 22, via a further valve opening 46. It is possible for example for a pressure-limiting valve to be connected into the valve opening 46. If the pressure for example in the filter, which may be inserted into the filter receptacle 34, becomes too high, the pressure-limiting valve in the valve opening 46 can then establish a pressure medium connection between the filter receptacle 34 and the tank. The flow duct 44 is moreover bent through approximately 180 degrees. The bend extends uniformly from the valve receptacle opening 46 as far as the flow duct 32, into which the flow duct 44 opens.

The distributor block 1 furthermore has different detection openings 48, wherein one detection opening 48 opens into the flow duct 22, one opens into the flow duct 44, one opens into the filter receptacle 34, and a total of three open into the flow duct 36. The detection openings 48 may accommodate for example sensors and/or measurement devices which, for example, measure the pressure or the temperature.

A multiplicity of fastening points 50 are also inserted into the valve block 1. Said fastening points are situated on all the surfaces of the valve block 1, apart from the surfaces 8, 10. For reasons of clarity, just one fastening point 50 is provided with a reference sign.

Figure 1B:
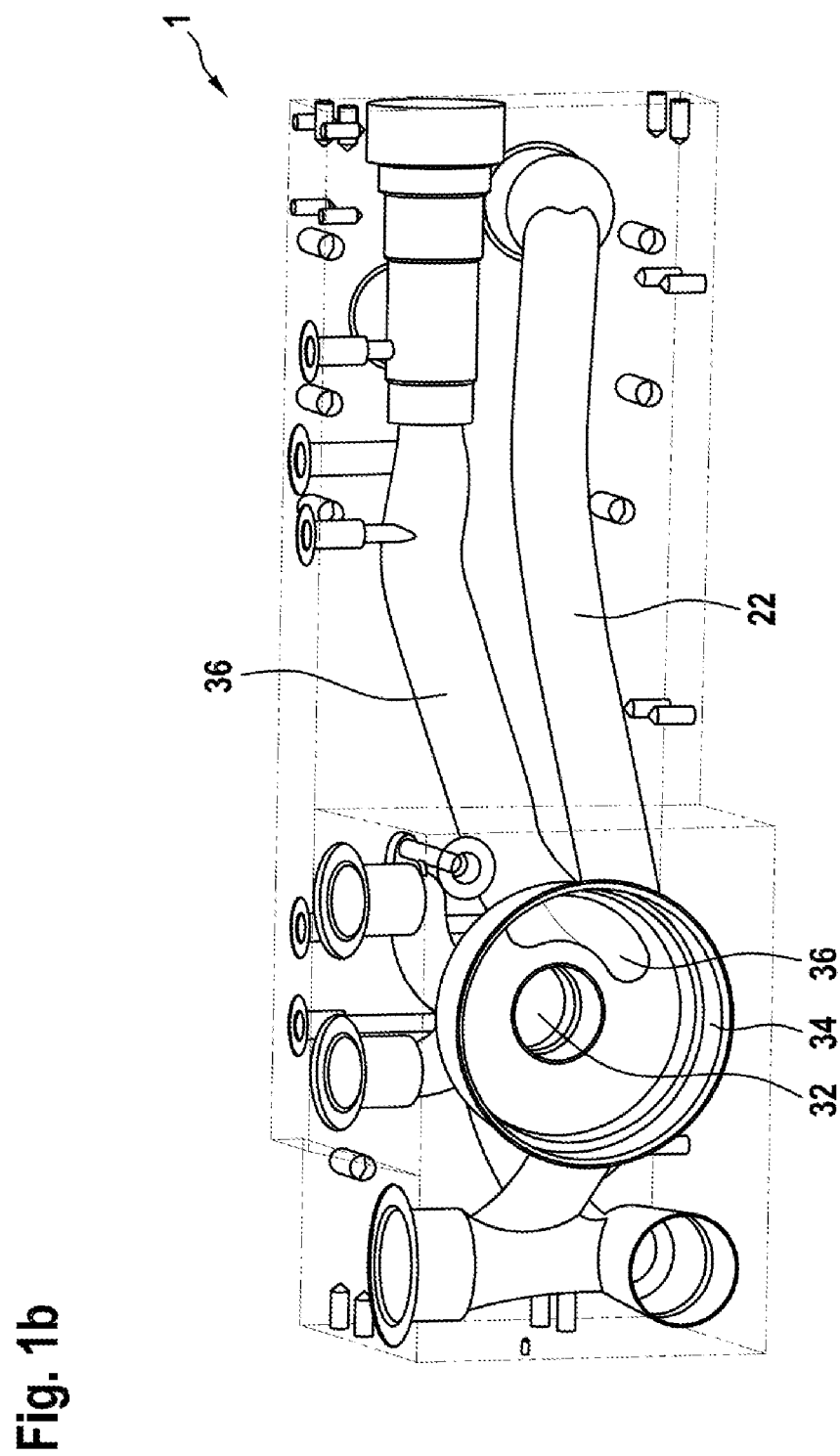
FIG. 1b shows a perspective view of the distributor block.

A further perspective view of the valve block 1 is given in FIG. 1*b*, with the filter receptacle 34 being illustrated. Here, it can be seen that the flow duct 32 and the flow duct 36 open into the filter receptacle. It can furthermore be seen that both the flow duct 36 and the flow duct 22 do not have a one-dimensional bend, but rather the bend extends in two planes.

Figure 2A:
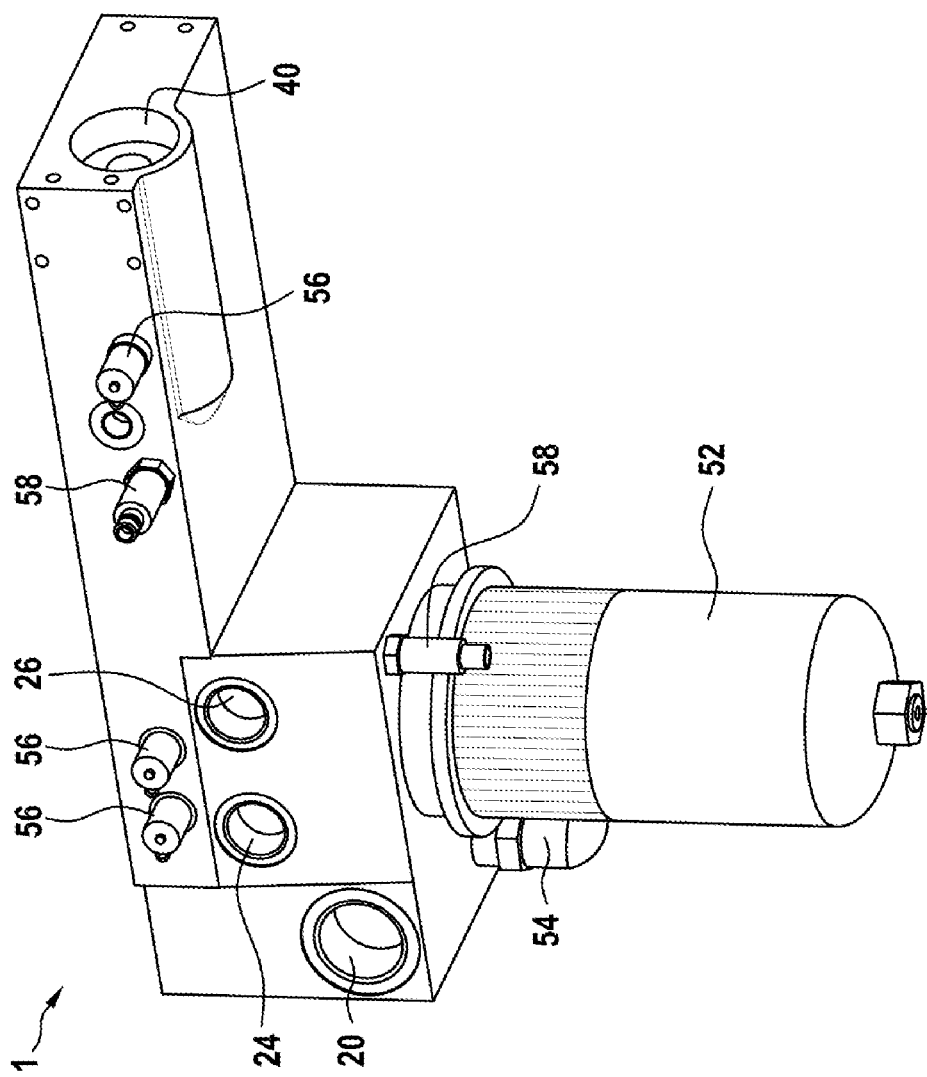
FIG. 2a shows a perspective view of the distributor block with functional elements.

In FIG. 2*a*, the valve block 1 is illustrated having different functional elements, such as a pressure filter 52, which is inserted into the filter receptacle 34 (see FIG. 1*b*). Furthermore, a pressure-limiting valve 54 is inserted into the valve receptacle opening 46 (see FIG. 1*a*). Moreover, sensors 56 and measurement devices 58 are inserted into the detection openings 48.

Pressure hoses, for example, may be connected to the tank port opening 20 and the pump port openings 24, 26 (see FIG. 1), wherein pressure ports may be connected from a pump, or from two pumps, to the pump port openings 24, 26. It is furthermore possible for a further valve to be inserted into the valve opening 40.

It can also be seen that the basic shape of the valve block 1 is matched to a large extent to the flow duct 36, and to the valve opening 40, and the valve block 1 is partly matched to the flow duct geometry.

A hydraulic distributor block for fluid guidance, having at least two port surfaces which each have at least one port opening, is disclosed. The port openings of the port surfaces are moreover connected by a flow duct, with the latter having at least one bend which is continuously curved and the port surfaces being spatially separated from one another.

LIST OF REFERENCE SIGNS

| | |
|---|---|
| 1 | Distributor block |
| 4, 6, 8, 10, 42 | Surfaces |
| 12, 14 | Port surfaces |
| 16, 18 | Consumer port openings |
| 20 | Tank port opening |
| 22, 28, 30, 32, 36, 44 | Flow duct |
| 23 | Inclined port surface |
| 24, 26 | Pump port openings |
| 34 | Filter receptacle |
| 38 | Portion |
| 40, 46 | Valve opening |
| 48 | Detection openings |
| 50 | Fastening point |
| 52 | Pressure filter |
| 54 | Pressure-limiting valve |
| 56 | Sensor |
| 58 | Measurement device |

The invention claimed is:

1. A hydraulic distributor block for fluid guidance, comprising:
    at least one first port surface defining at least one consumer port opening configured to connect to at least one consumer;
    at least one second port surface defining at least one port opening, the at least one first port surface and the at least one second port surface being spatially separated from one another; and
    at least one flow duct defined in the hydraulic distributor block and connecting the at least one port opening and the at least one consumer port opening, the at least one flow duct having at least one continuously curved bend.

2. The hydraulic distributor block according to claim 1, wherein the flow duct has at least one bend of at least 180° and/or at least two bends of at least 90°.

3. The hydraulic distributor block according to claim 1, wherein the at least one continuously curved bend is surrounded by material in one piece.

4. The hydraulic distributor block according to claim 1, wherein the at least one first port surface and/or the at least one consumer port opening is configured to connect to the consumer directly, via a multistation plate, or via a base plate.

5. The hydraulic distributor block according to claim 1, wherein:
    a first flow duct of the at least one flow duct connects a first consumer port opening of the at least one consumer port opening to a first pump port opening of the at least one port opening, and
    a second flow duct of the at least one flow duct connects a second consumer port opening of the at least one consumer port opening to a second port opening of the at least one port opening, the second port opening being a tank port opening.

6. The hydraulic distributor block according to claim 1, further comprising:
    at least one valve opening configured to receive a valve, the at least one valve opening connected to one or more flow ducts of the at least one flow duct.

7. The hydraulic distributor block according to claim 1, further comprising:
    at least one filter receptacle configured to at least partially receive a filter.

8. The hydraulic distributor block according to claim 7, wherein the filter receptacle (34) is connected to a first flow duct of the at least one flow duct.

9. The hydraulic distributor block according to claim 1, further comprising:
    at least one detection opening configured to receive at least one of a sensor and a measurement device, the at least one detection opening connected to one or more flow ducts of the at least one flow duct.

10. The hydraulic distributor block according to claim 1, wherein at least one surface of the at least one first port surface and/or of the at least one second port surface is inclined at an angle between 0° and 90° with respect to an adjacent surface.

11. The hydraulic distributor block according to claim 1, wherein an outer basic shape of the distributor block is at least partly matched to at least one of (i) the at least one flow duct, (ii) a valve opening, (iii) a sensor opening, (iv) a measurement port, and (v) a filter receptacle.

12. A hydraulic assembly comprising:
    a hydraulic distributor comprising:
        at least one first port surface defining at least one consumer port opening configured to connect to at least one consumer;
        at least one second port surface defining at least one port opening, the at least one first port surface and the at least one second port surface being spatially separated from one another; and
        at least one flow duct defined in the hydraulic distributor block and connecting the at least one port opening and the at least one consumer port opening, the at least one flow duct having at least one continuously curved bend.

13. A method of producing a hydraulic distributor block comprising:
    forming at least one consumer port opening in at least one first port surface, the at least one consumer port opening configured to connect to at least one consumer;
    forming at least one port opening in at least one second port surface, the at least one first port surface and the at least one second port surface being spatially separated from one another; and
    forming at least one flow duct in the hydraulic distributor block connecting the at least one port opening and the at least one consumer port opening, the at least one flow duct having at least one continuously curved bend.

14. The method according to claim 13, further comprising:
    providing a casting mold for an outer basic shape of the distributor block;
    creating a core casting mold of a negative of the at least one flow duct by 3D printing;
    assembling the casting mold and the core casting mold; and
    casting in the casting mold around the core casting mold so as to form the at least one consumer port opening, the at least one port opening, and the at least one flow duct.

15. The method according to claim 13, further comprising:
    providing a casting mold for an outer basic shape of the distributor block;
    creating the at least one flow duct from pipe parts;
    arranging the at least one flow duct into the casting mold; and
    casting in the casting mold around the pipe parts so as to form the at least one consumer port opening, the at least one port opening, and the at least one flow duct.

16. The method according to claim 13, further comprising:
    3D metal printing the hydraulic distributor block so as to form the at least one consumer port opening, the at least one port opening, and the at least one flow duct.

* * * * *